(12) United States Patent
Van Erlach

(10) Patent No.: US 8,965,808 B1
(45) Date of Patent: Feb. 24, 2015

(54) PRINT TO E-BOOK CONVERSION

(71) Applicant: Julian Van Erlach, Dallas, TX (US)

(72) Inventor: Julian Van Erlach, Dallas, TX (US)

( * ) Notice: Subject to any disclaimer, the term of this patent is extended or adjusted under 35 U.S.C. 154(b) by 0 days.

(21) Appl. No.: 14/250,756

(22) Filed: Apr. 11, 2014

Related U.S. Application Data

(60) Provisional application No. 61/964,362, filed on Jan. 2, 2014.

(51) Int. Cl.
```
G06F 21/00      (2013.01)
G06Q 50/18      (2012.01)
G06Q 10/00      (2012.01)
G06F 21/10      (2013.01)
```

(52) U.S. Cl.
CPC .............. G06Q 50/184 (2013.01); G06Q 10/00 (2013.01); G06F 21/10 (2013.01)
USPC ............................................. 705/59; 726/26

(58) Field of Classification Search
USPC ............................................. 705/59; 726/26
See application file for complete search history.

(56) References Cited

U.S. PATENT DOCUMENTS

| | | | |
|---|---|---|---|
| 2004/0158712 A1* | 8/2004 | Lee et al. ........................ | 713/165 |
| 2007/0117079 A1* | 5/2007 | Budlow et al. ................. | 434/317 |
| 2008/0313105 A1* | 12/2008 | Mattern ......................... | 705/410 |
| 2012/0116979 A1* | 5/2012 | Hatch et al. .................... | 705/80 |

* cited by examiner

*Primary Examiner* — Tsan-Yu J Huang

(57) ABSTRACT

A method for processing a print work. A first entity's ownership of a print work that is lawfully owned by the first entity is recorded. The print work is a physical copy of an original copyrighted work. A disablement of the print work is recorded. While the disablement exists, a digital copy of the original work is generated or received. After initiation of generating or receiving the digital copy: (i) a digital association linking the digital copy with both the recorded ownership and the recorded disablement is generated; and (ii) the digital association is recorded in the digital copy and/or in hardware storage units. Another entity may generate the digital copy and a unique identifier of the digital copy which associates the digital copy with a unique identification of the print work.

28 Claims, 4 Drawing Sheets

PRINT TO E-BOOK CONVERSION

CROSS-REFERENCES TO RELATED APPLICATIONS

This patent application claims priority to U.S. Provisional No. 61/964,362, filed on Jan. 2, 2014, which is incorporated herein by reference in its entirety.

TECHNICAL FIELD

The present invention pertains to ownership, disablement, and digital rendering of a periodical, a book or other manuscript or other literary work.

BACKGROUND

A large number of physical books exist whose owners have purchased them, and by means of that purchase, royalties due authors have been paid. Many of these books are stored and no longer used by their owners, are donated, or discarded. Still others are sold as used to others with no royalty due the author under the legal principle of copyright exhaustion. Under this principle, the digital rendition of a specific physical book that can no longer be used may be legally eligible for loan or resale to another user since the content, not the physical existence of a print book, is the substance of the copyright.

Some e-books are produced simultaneously with the production of a printed format, as described in electronic publishing, though in many instances they may not be put on sale until later. Often, e-books are produced from pre-existing hard-copy books, generally by document scanning, sometimes with the use of robotic book scanners, having the technology to quickly scan books without damaging the original print edition. Scanning a book produces a set of image files, which may additionally be converted into text format by an Optical Character Recognition (OCR) program. Occasionally, as in some e-text projects, a book may be produced by re-entering the text from a keyboard.

Digital Rights Management (DRM) mechanisms may be employed to prevent such digital renditions from being shared or copied among end-users. A secondary market which allows users to effectively and legally transfer "used" digital objects to others while maintaining scarcity is beyond scope of this invention and is addressed by pending and allowed patents. A "used" digital object is one which at inception was digital in form in such context.

As use of digital objects increases, users may wish to transfer the digital objects to other users. These transfers may include a sale, a rental, a gift, a loan, a trade, a sale of digital rendition rights etc. However, several problems manifest when transferring a digital object. While a physical object such as a copy of a paperback book only exists in one place at a time, easy and inexpensive copies of a digital object without loss of fidelity are possible. Thus, easy copying and repeated sale of the same digital object is possible, potentially eliminating scarcity of the digital object. Because of this, many owners implement digital rights management to prevent such impermissible transfers. Furthermore, the digital object as originally transferred to the initial purchaser may have license restrictions or other limitations on permissible use or further transfer. For example, a license to use a free download of a popular song may expire after a few days.

A secondary market which allows users to effectively and permissibly transfer "used" digital objects, or digital renditions of used print objects, to others while maintaining scarcity is therefore desired. A "used" digital object is one to which a user has legitimately obtained access or ownership rights (hereinafter "access rights"), and to which the user may permissibly transfer to another user.

BRIEF SUMMARY

The present invention provides a method for processing a print work, said method comprising:

recording, by one or more processors in one or more computer readable hardware storage units, a first entity's ownership of a print work that is lawfully owned by the first entity, said print work being a physical copy of an original copyrighted work in a literary work category for which copyright protection is provided to a second entity under United States or foreign copyright law, subject to a limitation that the physical copy is fixed in a physically tangible form that is a non-electronic form and a non-digital form, said print copy being under copyright protection for the second entity that owns a copyright for an original work from which the print work was generated, said first and second entities being different entities;

recording, by the one or more processors in the one or more hardware storage units, a disablement of the print work, said disablement leaving the print work in a reversible state of disablement or in an irreversible state of disablement in which the print work is unusable as a work for which the copyright exists;

after said recording both the ownership and the disablement of the print work and while the state of disablement exists, generating or receiving, by the one or more processors, a digital copy of the original work, said digital copy and the print work being substantially similar copies of the original work aside from the digital copy being in a digital format; and after initiation of said generating or receiving the digital copy: (i) generating, by the one or more processors, a digital association linking the digital copy with both the recorded ownership and the recorded disablement; and (ii) recording, by the one or more processors, the digital association in the digital copy and/or in the one or more hardware storage units.

The present invention provides a computer program product, comprising one or more computer readable hardware storage devices having a computer readable program code stored therein, said program code containing instructions which, upon being executed by one or more processors of a computer system, implement a method for processing a print work, said method comprising:

recording, by the one or more processors in one or more computer readable hardware storage units, a first entity's ownership of a print work that is lawfully owned by the first entity, said print work being a physical copy of an original copyrighted work in a literary work category for which copyright protection is provided to a second entity under United States or foreign copyright law, subject to a limitation that the physical copy is fixed in a physically tangible form that is a non-electronic form and a non-digital form, said print copy being under copyright protection for the second entity that owns a copyright for an original work from which the print work was generated, said first and second entities being different entities;

recording, by the one or more processors in the one or more hardware storage units, a disablement of the print work, said disablement leaving the print work in a reversible state of disablement or in an irreversible state of disablement in which the print work is unusable as a work for which the copyright exists;

after said recording both the ownership and the disablement of the print work and while the state of disablement exists, generating or receiving, by the one or more processors, a digital copy of the original work, said digital copy and the print work being substantially similar copies of the original work aside from the digital copy being in a digital formatk; and after initiation of said generating or receiving the digital copy: (i) generating, by the one or more processors, a digital association linking the digital copy with both the recorded ownership and the recorded disablement; and (ii) recording, by the one or more processors, the digital association in the digital copy and/or in the one or more hardware storage units.

The present invention provides a method for providing digital content of a print work, said method comprising:

receiving, from a sending computer by one or more processors of a recording entity, a request for the recording entity to generate a digital copy of the print work, wherein the request includes a unique identification of the print work and verification that both ownership of the print work by the print work's owner and disablement of the print work have been recorded;

in response to said receiving the request, generating, by the one or more processors, the digital copy and a unique identifier of the digital copy which associates the digital copy with the unique identification of the print work; and transmitting, by the one or more processors, the digital copy and the unique identifier of the digital copy to the sending computer.

The present invention provides a computer system comprising one or more processors, one or more memories coupled to the one or more processors, and one or more computer hardware readable storage device coupled to the processor, said one or more storage devices containing program code which, upon being executed by the one or more processors via the one or more memories, implement a method for providing digital content of a print work, said method comprising:

receiving, from a sending computer by the one or more processors of a recording entity, a request for the recording entity to generate a digital copy of the print work, wherein the digital copy is substantially similar to the print work, wherein the request includes a unique identification of the print work and verification that both ownership of the print work by the print work's owner and disablement of the print work have been recorded;

in response to said receiving the request, generating, by the one or more processors, the digital copy and a unique identifier of the digital copy which associates the digital copy with the unique identification of the print work; and transmitting, by the one or more processors, the digital copy and the unique identifier of the digital copy to the sending computer.

DETAILED DESCRIPTION

Figure 1:
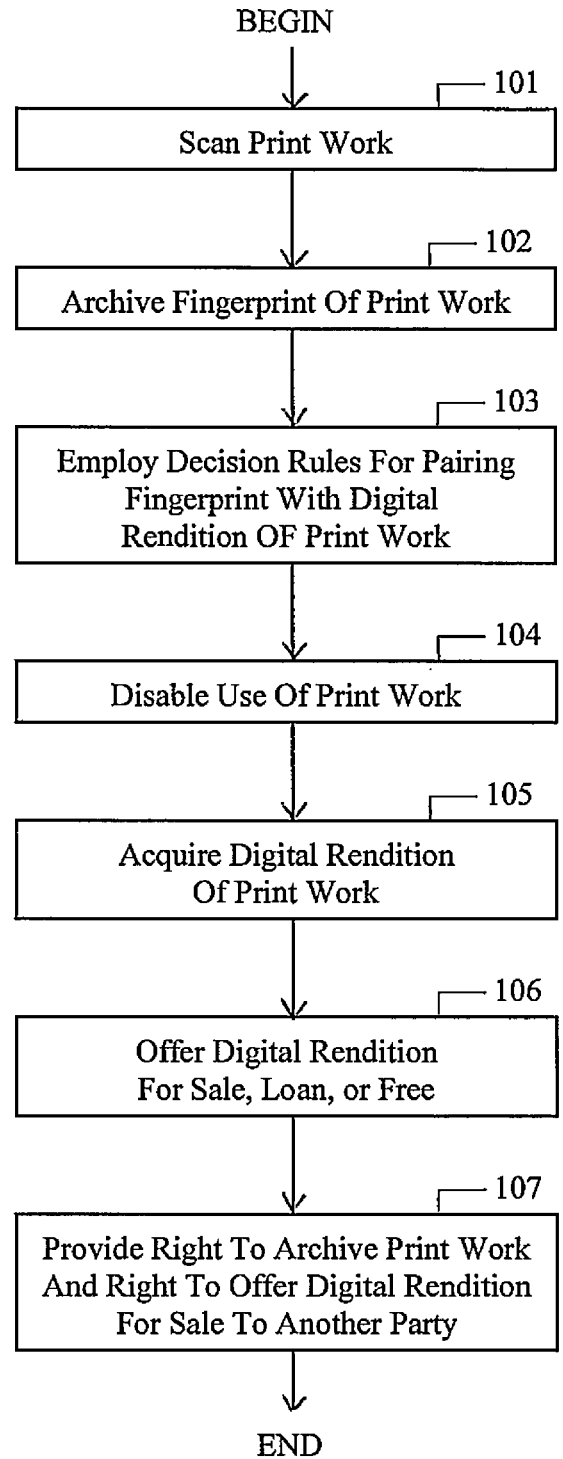
FIG. 1 depicts an embodiment of a method of providing for sale or loan a digital rendition of a physical print work, in accordance with embodiments of the present invention.

This patent application claims the benefits of all copyright laws and is deemed as copyrighted as of the filing date. All rights reserved.

The present invention provides computerized program code or software stored in one or more hardware storage devices, and a process and method implemented by the program code, for enabling provision of digital renditions of a print work, such as a book or other manuscript, while maintaining a pair relationship between at least one print work disabled from further use and a specific digital rendition of some or all of the content of that print work. A digital rendering of a print work comprises an act of generating a digital copy of the print work. Thus, a digital rendition of a print work is a digital copy of the print work. A print work is defined herein as a discrete physical copy of an original copyrighted work in a literary work category for which copyright protection is provided under United States or foreign copyright law, subject to a limitation that the physical copy is fixed in a physically tangible form that is a non-electronic form and a non-digital form.

The phrase "physical item" is defined herein as the aforementioned physical copy of an original work in a literary work category for which copyright protection is provided under United States or foreign copyright law, subject to a limitation that the physical item (i.e., physical copy) is fixed in a physically tangible form that is a non-electronic form and a non-digital form.

Foreign copyright law is defined herein as copyright law of a legal jurisdiction outside of the legal jurisdiction of the United States. Foreign copyright law may include, inter alia, copyright law of a foreign country (e.g., France, Japan, Canada, etc.) outside of the United States or of a union of countries (e.g., Europeon Union) outside of the United States.

A digital rendition of a print work may be created. In one embodiment, the present invention facilitates the digital rendition resale, trading loaning or giving of the copyrighted content of a print work provided that the owner of the print work can first no longer use that print work and has not sold and cannot sell or otherwise transfer the print work, and copyright royalties associated with the print work have been paid. Said method comprises the steps of archiving an instance of ownership of a print work; and archiving the disabling means that disables the print work prior to making a digital rendition of the print work which ensures that said print work cannot and will not be used, sold or transferred after the disablement which occurs prior to making the digital rendition of the print work. A one-to-one association is thus maintained between a print work and digital rendition of substantially the same copyrighted content of the print work while assuring one and only one version of the copyright paid content is usable at the same time. A unique identifier of said association of said rendered digital copy of said print work and said print work may be created and registered in a database in one or more hardware storage devices which may be referenced by other parties to ensure that the pair relationship is maintained without duplicate digital rendering taking place with reference to the same print work; or said association may be embedded in the digital rendition and amended with each subsequent transaction associated with the digital rendition. Further, a means of transferring a right to offer for sale or loan of a digital rendition of a print work owned by a first party to another party may be effected, said means of transferring the right comprising: the process of the first party providing a digital verification of an owned print work that may be assumed to have been purchased and have triggered a copyright royalty payment to the author; an affidavit or archived disablement evidence ensuring no further ability to use said work, such as an affidavit of destruction, an agreement to grant the second party a right or the exclusive right to sell or loan the digital rendition of said work, and a potential fee or revenue-sharing agreement and mechanism. Said right transfer pertains to a process that may include the step of a provider of said right registering in a database and further registering the assignment of said right to said specific print work thus enabling documentation of the transfer of said right which may be accessed by outside parties. The invention differs from previous inventions which describe means of creating a market for content that began as digital content, not as content of a print work.

The present invention provides a novel process for selling or loaning digital renditions of previously purchased print works. This process involves steps of maintaining a one to one correspondence between such a digital rendition and the specific or substantially identical previously used or purchased print work from which the digital rendition is derived; and the further step of first assuring that the specific print work can no longer be used prior to, during, and after the existence of the digital rendition and its commercial offer. This latter step may comprise a legally adequate record of ownership; which may be digital (an image and other record of an instance of ownership) or physical such as retention and sequestering of all or part of a physical book; and a record of sequestering or destruction of the print work thus preventing future use.

With the present invention, one or more networks, using one or more computing devices, are provided and are operatively configured for allowing authorized access to (or ownership) of a digital content item to be transferred from one user to another wherein the digital item is a rendition of a print work; wherein a one to one correspondence is maintained between the digital content item and the print work; the physical item is first disabled for use and records of these steps are generated and maintained. A first user purchases, leases, or trades a digital content item, such as a digital book, from an online store or another user, wherein said digital book is a rendition associated with a specific print work, such as a document, that is disabled from further use or resale. Records of ownership are maintained of the physical book and its associated digital rendition, the disabling of the physical book, and future resales of the digital item wherein the online store or public registry, or metadata embedded in the rendition determines whether one or more criteria are satisfied in order to allow the transfer in ownership to take place. If the one or more criteria are satisfied, which criteria may include validation of prior ownership and prior disablement of a print work associated with a digital rendition, and generation and recordation of a digital association linking the digital rendition with prior ownership and the prior disablement, then the online store or transfer mechanism stores data that reflects the transaction and updates authorization data that authorizes a second user purchasing, leasing, borrowing, or obtaining a right to said digital rendition to access the digital content item and prevents the first or providing user from accessing the digital content item. Alternatively, instead of a third party determining whether one or more criteria are satisfied, the first (or second) user's device makes the determination and may be responsible for preventing the first user's device from further consuming the digital content item. In some embodiments, the online store and/or the publisher of the digital content item may receive a portion of the proceeds of the transfer.

In one embodiment, print works such as books are identified by automated or manual means such as by scanning of product codes or matching of images, dimensions or weights sufficient to identify a specific edition of a print work, or a manual process involving entry of an identifying product code or title to determine the edition and identity of a print work such as a title and edition, author, publication year, ISBN. Rules determine if the print work should, instead of being sold in physical form, be offered for sale, loan, or freely in the form of digital rendition.

FIG. 1 depicts an embodiment of a method of providing for sale or loan a digital rendition of a physical print work, in accordance with embodiments of the present invention. The method of FIG. 1 maintains a direct or indirect pair relationship between a specific or identical physical version and a digital rendition, of at least one physical copy instance of ownership and the digital rendition wherein further use of the at least one physical copy associated with the digital rendition is further rendered unusable prior to the initiation of existence of the digital rendition. The maintained pair relationship assures that for every digital rendition, at least one print work of substantially identical content has been owned and effectively disabled from further use, sale or lease.

A fingerprint process ("fingerprinting") of the print work is implemented by an entity possessing the print work. The fingerprinting may be implemented either manually or through automation such as via a digital scanning system configured on a conveyor, to generate a fingerprint of the print work which is a unique attribute of the print work that uniquely identifies the print work. The print work may be scanned (step 101) which scan may be of a product code such as a bar code or Radio-frequency Identification (RFID), an OCR (optical character recognition) of an ISBN number, an image recognition of a unique attribute of the print work such as a cover, or manual research of the book. A record of this fingerprinting is archived (step 102) in a computer readable hardware storage device which fingerprinting and the archived record may be uniquely identified with information such as name of the owner entity, date, time, location, item of machinery employed and evidence of the fingerprinting of the print work which may be digital photographic in nature and may further include a unique identifying code generated to identify the fingerprinting. Decision rules (step 103) may be employed which determine that the fingerprinting will be reserved for a pairing with a digital rendition of the content of the print work, which rendition may be offered for sale or loan. Furthermore, steps may be taken which effectively disable further use of the print work (step 104) which may comprise partial or total destruction, sequestration or other disablement means of the print work. The archive or disablement of the print work may be physical wherein all or part of the print work may be defaced or destroyed physically thus disabling future use of the print work. All or part of the print work may be stored physically or digitally wherein a digital-only record of the fingerprinting is stored and disablement of the print work is maintained by digital sequester. Further evidence of destruction of the print work may be provided and archived which may include a relegation of the print work to sale to a paper pulp company operating under an affidavit of destruction of print matter that the company receives.

The archived fingerprinting of the print work and a record of disablement of the print work is written to a database in one or more hardware storage devices which may be a public database. A digital rendition may be subsequently acquired (i.e., generated by the party who scanned the print work or obtained from another party) (step 105) which may be a copy from a digital master and may include DRM (digital rights management protection) and a unique identifier (ID) which identifies an association of the digital rendition with the fingerprint of the print work. The ID of the digital rendition and/or of the association may be linked to the digital record of the fingerprinting of the print work and written to the database. All further transactions involving the digital rendition such as transfers of ownership may be written and tracked in a database or embedded in the digital rendition so that the history of the rendered digital item is traceable.

The digital rendition tied to the print fingerprinting may be offered for sale, loan or free (step 106). Future transactions involving the digital rendition may be written to and tracked through the database which may be a public secure database.

A variation of the embodiment may involve the use of a smart device by a print work owner who uses the smart device to document and archive the ownership by the owner and disablement of said print work in preparation for an offer for sale or loan of a digital rendition of said print work either by that owner or by transfer of this right to another party. The owner may follow a process similar to steps 101-107 and engage the services of a digital rendering provider of a single DRM-protected digital copy of his disabled print work which the user may then post for sale on an ecommerce store or peer-to-peer. The digital rendering provider may require a review of the owner's archive of the evidence of ownership and disablement of the print work prior to providing a digital rendering of the print work.

Alternatively, the owner may provide the archive of his print work and the rights to the offering for sale of the digital rendering to another party (step 107) in exchange for a fee or share of revenue; which other party may in turn follow a similar process as described here to obtain and offer a digital rendering of the print archive of the owner. Scarcity of said right (the existence of one and only one digital rendering associated with a specific archive of a specific disabled print work and potentially the existence of only one owner's right to access said digital rendering) and rendering may be documented by writing all associated transactions to said public database (step 104) thus maintaining the one-to-one association of a specific print work to its digital rendering and all future transfers of ownership of said rendering. Alternatively, all metadata concerning the genesis and transaction history of such a digital rendering may be embedded and appended within the rendering itself.

Instead of transferring an instance of the digital rendition or data item to a device, the content access metadata, that indicates that digital content item is owned by end-user A, may be updated to indicate that (a) end-user B is authorized to access said digital content item, and (b) end-user A no longer is authorized to access said digital rendition or content item. Any mechanism for indicating who is authorized (or not) to access the digital content item may be used. Based on the updated content access metadata, an intermediary entity may prevent end-user A from further accessing said digital content item after the transfer has been completed from user A to user B. Transactional updating of digital rendition metadata may be accomplished by any involved device including that of an intermediary or user A or B.

The digital rendering may be made by the processing of digital scanning of a print work or the obtaining of an original digital master from a publisher or copies thereof. The digital rendering may also be provided by another party which has performed said digital scanning of a print work. In exchange for the provision of a digital rendition by another party, the first party may present digital archive evidence of both ownership and disablement of at least one instance of a print work.

The present invention provides embodiments in which a process, some or all of which may be digital, of archiving or documenting ownership of a print work, which may be a specific print work, and associating that ownership with evidence of disablement from further use of that print work. These embodiments depict alternative methods of fingerprinting (i.e., uniquely identifying) a print work and include a product code scan such as a barcode sufficient to identify a specific print work version for example by author, title, binding, edition, etc.; an image-based identification, such as a cover image, which may further include matching other attributes such as weight and dimensions of a print work sufficient to uniquely identify a specific version or a manual identification which may involve visual inspection and title search which may involve a computer system. Furthermore, a print work may be selected from previously known inventory for sale as a digital rendition through use of business rules. Business rules may be applied to an identified print work, which business rules may indicate that commercialization as a digital rendition is desirable. Thereupon, a form of disablement of the specific or like print work from future use as a print work may be performed, which may be effected by segregation from future sale and use or whole or partial destruction.

An archiving may be performed, in any sequence, of both the ownership instance and disablement of the print work which archive may be in one or more places including one or more databases or the digital rendition itself. The archive may be digital. Furthermore, the archive may be internal to the entity performing the steps, or public, such as a public registry. The steps of archiving may involve unique identifiers of one or more of the instance of ownership and disablement. These identifiers may include the name of the entity owning the print work, circumstance, location and date of ownership, such as a specific time, date, address and equipment used, and may be digitally photographic in nature. Likewise, the disablement step may include such data and means.

The present invention provides embodiments of a process for digital rendition of a print work whose ownership and disablement are associated with a the digital rendition. Steps in these embodiments may be taken by one or more parties. For example, steps may be taken by a first party having a digital master containing some or all of the content of a print work designated for digital rendition sale. Or, another party in possession of a digital master may make a copy, which may be protected by a form of DRM or digital rights management, and provide it to the first party. The digital master may be obtained by digitally scanning a print work and formatting may be applied to achieve desired content format and visual appearance or metadata tagging of portions of content. The party fingerprinting the print work may also temporarily transfer a right to the party providing a digital rendering in order to satisfy any copyright stipulation that only the party having the right stemming from lawful ownership of a disabled print work may make a digital rendering of the print work.

An archive may contain related metadata such as identifying information about the entity performing the archive, date and time, location, means used such as manual processing or automated processing equipment, data or image records of print work disablement such as physical deformity, sequestering in storage and barred from sale or disposition as pulp. The metadata may be placed in the archive via, inter alia, a smart device (e.g., a smart phone) used by an individual.

An archived record of ownership and disablement of a print work may be presented by a first party to another party whereupon that other party provides the first party a digital rendition of at least substantially all of the content of said print, which rendition may be DRM protected. Either party may embed the digital rendition with unique identifying metadata and metadata relating to the archive of the print work; and/or either party may register in a registry, such as a public database, a unique identifier of the digital rendition and a unique identifier of an association of the digital rendition to the archived identifier of the print work. Thus, the association of the digital rendition and print work is maintained. Either party may register in a registry via, inter alia, a smart device (e.g., a smart phone) used by an individual.

The digital rendition may then be offered for sale by the first party via, inter alia, a smart device (e.g., a smart phone) used by an individual. The digital rendition may be DRM protected in one embodiment after generation of an embedded and/or public archive of the prior print copy's lawful ownership and disablement.

It should be noted that the steps in the steps in the preceding embodiment may be performed in any sequence, and not necessarily in the sequence described supra. The embodiments allow transactions between content rights holders and buyers as well as for a centralized store of rights and content. Authorized access to digital content, otherwise known as digital rights, may be transferred from one user to another. As an example, a first user may purchase an e-book from the Apple iBookstore and later decide to sell that content of the e-book to a second user. The first user notifies the store that they want to sell the item, and if certain criteria are met, the first user is allowed to transfer rights to the second buyer. Content itself may or may not change hands, but more importantly the rights attached to said content is managed so that the first user can no longer access the content once it is sold.

The present disclosure is novel over prior art, by maintaining a one-to-one association between an owned print work wherein copyright royalties have plausibly been previously paid through purchase of said print work and a digital rendition of said print work content which may be offered for sale, loaned, or provided free, and by further documenting the disabling from further use of said print work and the metadata tracking of future transactions involving the rendered digital item.

A further provision may be made for a public database repository of said one to one associations of a print work and its digital rendition wherein a historic transaction record is maintained and is publically accessible for verification that the original print work existed, who the owner was, that is disabled from further use, and the specific identification of a single associated digital rendition which may be further DRM-enabled to prevent copying. A further record of future re-sales or other transfers of ownership right of the digital rendition may be maintained in said repository.

In a still further embodiment, a pool of disabled print works may be maintained either physically or in the form of digital documentation of ownership and destruction which back an up to exact number of digital renditions of said pool of specific print works; wherein the digital renditions may be offered for sale in a quantity up to and equal to the said pool of disabled print works.

Prior art describes methods of offering for sale, loan or freely works which began existence in digital, not print form. Copyright law compliance is not addressed by the prior art from the combined viewpoint of a print work and its digital rendition. An automated means is not provided to document instances of print ownership, association with a digital rendition of said print work, or a database repository, which may be public, of all transaction history associated with a disabled print work serving as the basis for transactions involving its digital rendition.

Figure 2:
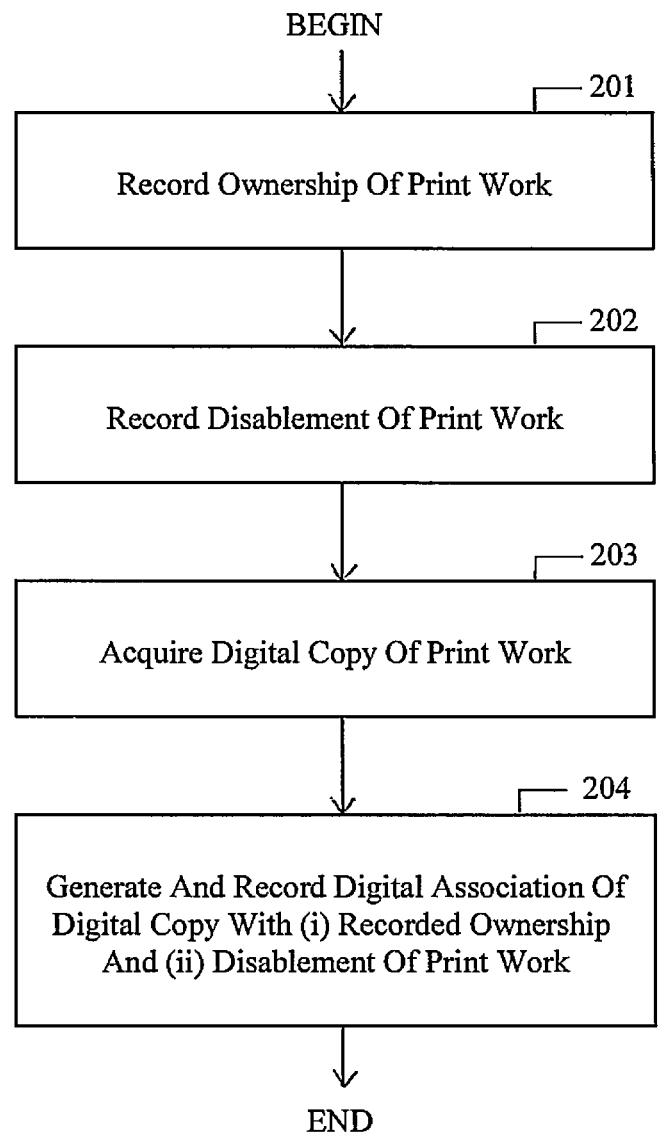
FIG. 2 is a flow chart describing a method for processing a print work, in accordance with embodiments of the present invention.

FIG. 2 is a flow chart describing a method for processing a print work, in accordance with embodiments of the present invention. FIG. 2 comprises steps 201-204.

Step 201 records a first entity's ownership of a print work in one or more computer readable hardware storage units. The print work is lawfully owned by the first entity. The print work is a physical copy of an original copyrighted work in a literary work category for which copyright protection is provided to a second entity under United States or foreign copyright law, subject to a limitation that the physical copy is fixed in a physically tangible form that is a non-electronic form and a non-digital form. The print work is under copyright protection for the second entity that owns a copyright for an original work from which the print work was generated. The first and second entities are different entities. The first entity and the second entity may each be one or more individuals or one or more organizations such as, inter alia, a business organization (e.g., a sole proprietorship, a corporation, etc.), a social organization, an educational organization, a labor union, etc.

Step 202 records a disablement of the print work in the one or more hardware storage units. The disablement of the print work leaves the print work in a reversible state of disablement or in an irreversible state of disablement in which the print work is unusable as a work for which the copyright exist.

In one embodiment, the disablement is a physical destruction of the print work, which leaves the print work in an irreversible state of disablement.

In one embodiment, the disablement is a physical sequester of the print work that physically isolates the print work from being physically accessible, which leaves the print work in a reversible state of disablement.

After the ownership has been recorded in step 201 and the disablement of the print work ownership has been recorded in step 202 and while the state of disablement of the print work exists, step 203 acquires a digital copy of the original work.

In one embodiment, acquiring the digital copy comprises generating the digital copy (e.g., by the first entity).

In one embodiment, acquiring the digital copy comprises receiving the digital copy (e.g., by the first entity) from a third entity in response to a request for the digital copy made by the first entity to the third entity, wherein the request includes a unique identification of the print work and verification that both the ownership and the disablement of the print work have been recorded. The third entity may be one or more individuals or one or more organizations such as, inter alia, a business organization (e.g., a sole proprietorship, a corporation, etc.), a social organization, an educational organization, a labor union, etc.

The digital copy and the print work are may be substantially similar copies of the original work aside from the digital copy being in a digital format.

In one embodiment, the digital copy is not generated from the disabled print work.

After the acquiring of the digital copy is initiated in step 203, step 204: (i) generates a digital association linking the digital copy with both the recorded ownership and the recorded disablement; and (ii) records the digital association in the digital copy and/or in the one or more hardware storage units.

In one embodiment, the digital association is generated before completion of generating the digital copy.

In one embodiment, the digital association is generated after completion of generating the digital copy.

In one embodiment, after the digital copy has been generated and while the state of disablement of the print work exists, content may be sent to one or more destination computers. The content may include an offer for, an advertisement of the offer for, and/or information relating to: purchasing the digital copy from the first entity, leasing the digital copy from the first entity, trading with the first entity for the digital copy, and/or purchasing from the first entity a right to sell the digital copy.

In one embodiment, the disabled print work is included in a pool of N substantially similar disabled print works: (i) which were generated from the original work, (ii) the ownership and disablement of which have been recorded in the one or more hardware storage devices, and (iii) from which N respective digital copies have been made, wherein N is at least 2. Moreover, while the N print works are disabled and after the N respective digital copies were generated, content is sent to one or more destination computers. The content may include an offer for, advertisement of said offer for, and/or information relating to: purchasing M digital copies of the N respective digital copies, leasing the M digital copies, trading for the M digital copies, and/or purchasing a right to sell the M digital copies, wherein M does not exceed N.

Figure 3:
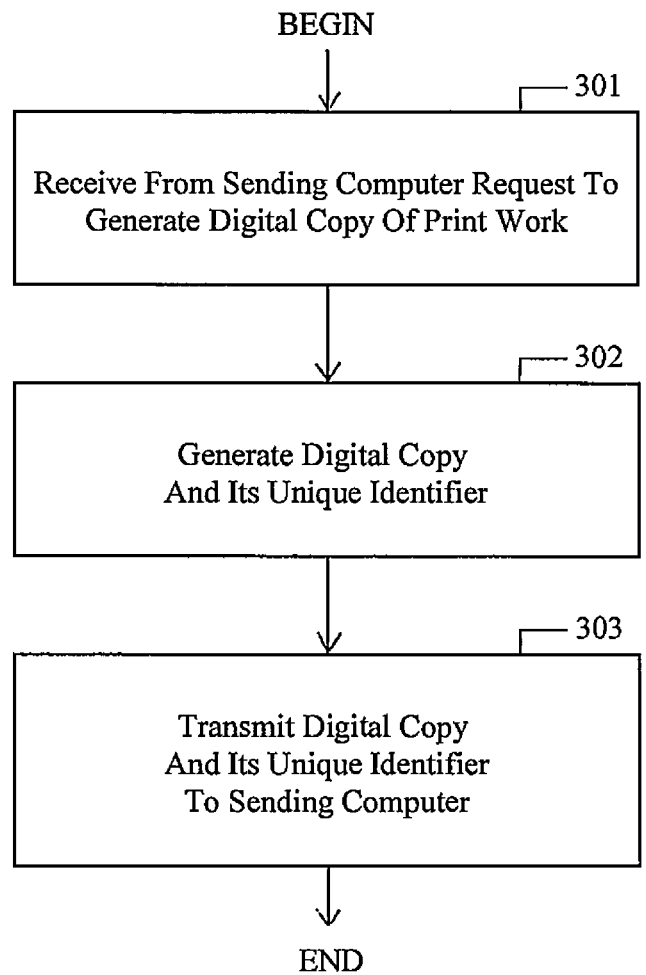
FIG. 3 is a flow chart describing a method for providing digital content of a print work, in accordance with embodiments of the present invention.

FIG. 3 is a flow chart describing a method for providing digital content of a print work, in accordance with embodiments of the present invention. FIG. 3 comprises steps 301-303.

In step 301, a recording entity receives, from a sending computer, a request for the recording entity to generate a digital copy of the print work. The request includes a unique identification of the print work and verification that both ownership of the print work by the print work's owner and disablement of the print work have been recorded.

The recording entity may be one or more individuals or one or more organizations such as, inter alia, a business organization (e.g., a sole proprietorship, a corporation, etc.), a social organization, an educational organization, a labor union, etc.

In step 302 in response to receiving the request, the recording entity generates the digital copy and a unique identifier of the digital copy which associates the digital copy with the unique identification of the print work.

In step 303, the digital copy and the unique identifier of the digital copy are transmitted to the sending computer.

In one embodiment, the digital copy is protected by a Digital Rights Management (DRM) mechanism.

These embodiments may involve networks that may be any type of communication network, including the Internet, a local area network, a wide area network, a wireless wide area network, a cable television network, a wireless network, a telephone network, etc. The network allows communicative coupling between electronic devices and servers, such as network resource server.

Electronic devices may include a personal computer, an entertainment system, a personal digital assistant (PDA) or other computing device that is capable of communicating over a network, including but not limited to, set-top boxes, mobile phones, smart phones, digital media players, tablets, laptop computers, desktop computers, electronic book readers, game consoles, servers, etc.

Network resource server may be either a single server or a larger collection of servers, such as a data center or multiple data centers. Network resource server may include one or more processors and a memory, the memory comprising one or more computer-readable storage media (CRSM). The CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a processor. The processor is configured to execute instructions stored in the memory. A computer system depicted in FIG. 4 may comprise the network resource server.

Figure 4:
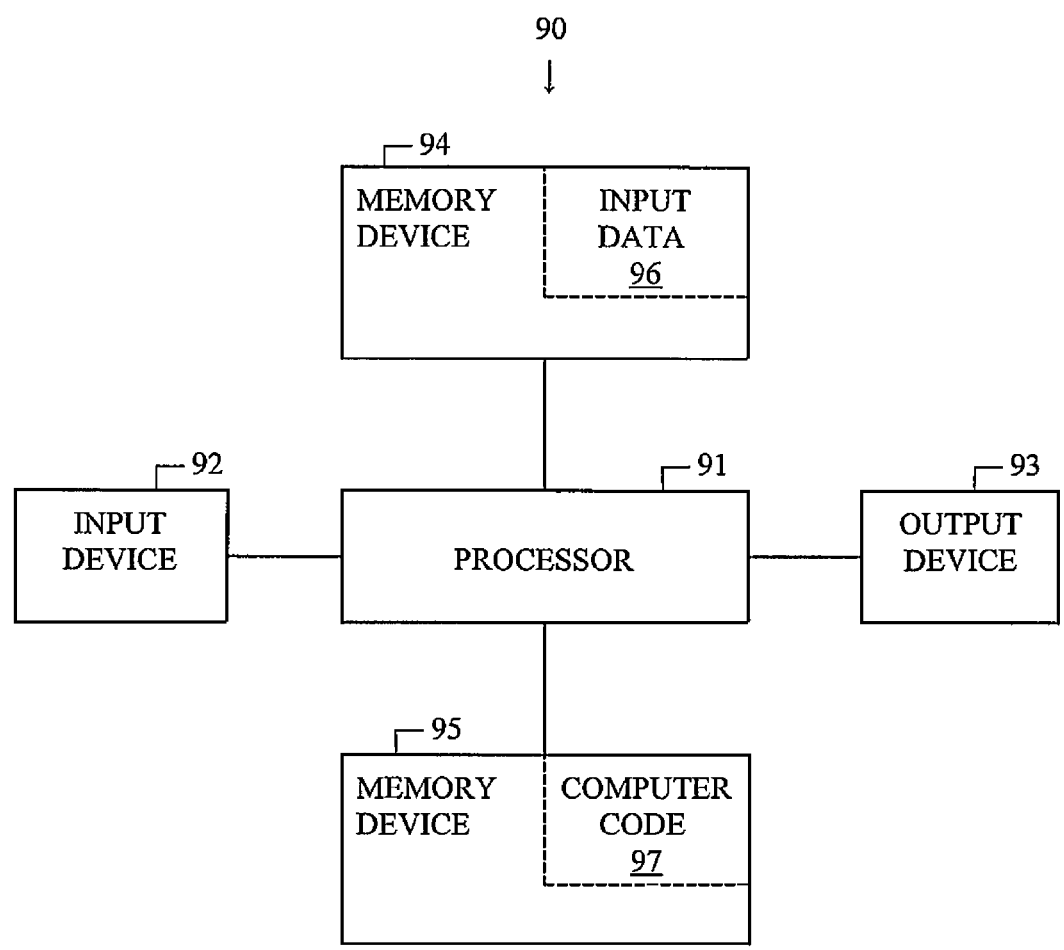
FIG. 4 illustrates a computer system used for implementing the methods of the present invention, in accordance with the embodiments of the present invention.

FIG. 4 illustrates a computer system used for implementing methods of the present invention, in accordance with the embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes computer program code 97 which is a computer program that comprises computer-executable instructions. The program code 97 includes software or program instructions that may implement methods of the present invention. The processor 91 executes the program code 97. The memory device 94 includes input data 96. The input data 96 includes input required by the program code 97. The output device 93 displays output from the program code 97. Either or both memory devices 94 and 95 (or one or more additional memory devices not shown in FIG. 4) may be used as a computer readable storage medium or device (or program storage device) having a computer readable program embodied therein and/or having other data stored therein, wherein the computer readable program comprises the program code 97. Generally, a computer program product (or, alternatively, an article of manufacture) of the computer system 90 may comprise said computer readable storage medium (or said program storage device). A computer readable storage device of the present invention, when storing the program code 97 for execution by one or more processors, is not a transmission medium such as a copper transmission cable, an optical transmission fiber, or a wireless transmission medium.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices. As another example, the processor 91 may represent one or more processors, and each memory device of memory devices 94 and 95 may represent one or more memory devices and/or one or more computer readable storage devices.

The forgoing embodiments are only exemplary. It will be obvious to those skilled in the art that other variations are possible. It should be emphasized that many variations and modifications may be made to the above-described embodiments, the elements of which are to be understood as being among other acceptable examples. All such modifications and variations are intended to be included herein within the scope of this disclosure and protected by its claims.

What is claimed is:

1. A method for processing a print work, said method comprising:

recording, by one or more processors in one or more computer readable hardware storage units, a first entity's ownership of a print work that is lawfully owned by the first entity, said print work being a physical copy of an original copyrighted work in a literary work category for which copyright protection is provided to a second entity under United States or foreign copyright law, subject to a limitation that the physical copy is fixed in a physically tangible form that is a non-electronic form and a non-digital form, said print copy being under copyright protection for the second entity that owns a copyright for an original work from which the print work was generated, said first and second entities being different entities;

recording, by the one or more processors in the one or more hardware storage units, a disablement of the print work, said disablement leaving the print work in a reversible state of disablement or in an irreversible state of disablement in which the print work is unusable as a work for which the copyright exists;

after said recording both the ownership and the disablement of the print work and while the state of disablement exists, generating or receiving, by the one or more processors, a digital copy of the original work, said digital copy and the print work being substantially similar copies of the original work aside from the digital copy being in a digital format; and after initiation of said generating or receiving the digital copy: (i) generating, by the one or more processors, a digital association linking the digital copy with both the recorded ownership and the recorded disablement; and (ii) recording, by the one or more processors, the digital association in the digital copy and/or in the one or more hardware storage units.

2. The method of claim 1, wherein the disablement is a physical destruction of the print work, which leaves the print work in said irreversible state of disablement.

3. The method of claim 1, wherein the disablement is a physical sequester of the print work that physically isolates the print work from being physically accessible, which leaves the print work in said reversible state of disablement.

4. The method of claim 1, wherein said generating or receiving the digital copy comprises generating the digital copy.

5. The method of claim 1, wherein said generating or receiving the digital copy comprises receiving the digital copy from a third entity in response to a request for the digital copy made by the first entity to the third entity, and wherein the request includes a unique identification of the print work and verification that both the ownership and the disablement of the print work have been recorded.

6. The method of claim 1, wherein said generating the digital association is performed before completion of said generating the digital copy.

7. The method of claim 1, wherein said generating the digital association is performed after completion of said generating the digital copy.

8. The method of claim 1, wherein said recording the digital association comprises recording the digital association in the digital copy.

9. The method of claim 1, wherein said recording the digital association comprises recording the digital association in the one or more hardware storage units.

10. The method of claim 1, said method comprising:

after said generating the digital copy and while the state of disablement of the print work exists, sending, by the one or more processors to one or more destination computers, an offer for, an advertisement of said offer for, and/or information relating to: purchasing the digital copy from the first entity, leasing the digital copy from the first entity, trading with the first entity for the digital copy, and/or purchasing from the first entity a right to sell the digital copy.

11. The method of claim 1, wherein the disabled print work is included in a pool of N substantially similar disabled print works: (i) which were generated from the original work, (ii) the ownership and disablement of which have been recorded in the one or more hardware storage devices, and (iii) from which N respective digital copies have been made, wherein N is at least 2.

12. The method of claim 11, wherein said method comprises:

while the N print works are disabled and after the N respective digital copies were generated, sending, by the one or more processors to one or more destination computers, an offer for, advertisement of said offer for, and/or information relating to: purchasing M digital copies of the N respective digital copies, leasing the M digital copies, trading for the M digital copies, and/or purchasing a right to sell the M digital copies, wherein M does not exceed N.

13. A computer program product, comprising:

one or more computer readable hardware storage devices having a computer readable program code stored therein, said program code containing instructions which, upon being executed by one or more processors of a computer system, implement a method for processing a print work, said method comprising:

recording, by the one or more processors in one or more computer readable hardware storage units, a first entity's ownership of a print work that is lawfully owned by the first entity, said print work being a physical copy of an original copyrighted work in a literary work category for which copyright protection is provided to a second entity under United States or foreign copyright law, subject to a limitation that the physical copy is fixed in a physically tangible form that is a non-electronic form and a non-digital form, said print copy being under copyright protection for the second entity that owns a copyright for an original work from which the print work was generated, said first and second entities being different entities;

recording, by the one or more processors in the one or more hardware storage units, a disablement of the print work, said disablement leaving the print work in a reversible state of disablement or in an irreversible state of disablement in which the print work is unusable as a work for which the copyright exists;

after said recording both the ownership and the disablement of the print work and while the state of disablement exists, generating or receiving, by the one or more processors, a digital copy of the original work, said digital copy and the print work being substantially similar copies of the original work aside from the digital copy being in a digital format; and after initiation of said generating or receiving the digital copy: (i) generating, by the one or more processors, a digital association linking the digital copy with both the recorded ownership and the recorded disablement; and (ii) recording, by the one or more processors, the digital association in the digital copy and/or in the one or more hardware storage units.

14. The computer program product of claim 13, wherein the disablement is a physical destruction of the print work, which leaves the print work in said irreversible state of disablement.

15. The computer program product of claim 13, wherein the disablement is a physical sequester of the print work that physically isolates the print work from being physically accessible, which leaves the print work in said reversible state of disablement.

16. The computer program product of claim 13, wherein said generating or receiving the digital copy comprises generating the digital copy.

17. The computer program product of claim 13, wherein said generating or receiving the digital copy comprises receiving the digital copy from a third entity in response to a request for the digital copy made by the first entity to the third entity, and wherein the request includes a unique identification of the print work and verification that both the ownership and the disablement of the print work have been recorded.

18. The computer program product of claim 13, wherein said generating the digital association is performed before completion of said generating the digital copy.

19. The computer program product of claim 13, wherein said generating the digital association is performed after completion of said generating the digital copy.

20. The computer program product of claim 13, wherein said recording the digital association comprises recording the digital association in the digital copy.

21. The computer program product of claim 13, wherein said recording the digital association comprises recording the digital association in the one or more hardware storage units.

22. The computer program product of claim 13, said method comprising:
after said generating the digital copy and while the state of disablement of the print work exists, sending, by the one or more processors to one or more destination computers, an offer for, an advertisement of said offer for, and/or information relating to: purchasing the digital copy from the first entity, leasing the digital copy from the first entity, trading with the first entity for the digital copy, and/or purchasing from the first entity a right to sell the digital copy.

23. The computer program product of claim 13, wherein the disabled print work is included in a pool of N substantially similar disabled print works: (i) which were generated from the original work, (ii) the ownership and disablement of which have been recorded in the one or more hardware storage devices, and (iii) from which N respective digital copies have been made, wherein N is at least 2.

24. The computer program product of claim 23, wherein said method comprises:
while the N print works are disabled and after the N respective digital copies were generated, sending, by the one or more processors to one or more destination computers, an offer for, advertisement of said offer for, and/or information relating to: purchasing M digital copies of the N respective digital copies, leasing the M digital copies, trading for the M digital copies, and/or purchasing a right to sell the M digital copies, wherein M does not exceed N.

25. The method of claim 5, said method further comprising:
in response to receiving the request for the digital copy, generating, by at least one processor of the third entity, the digital copy and a unique identifier of the digital copy which associates the digital copy with the unique identification of the print work; and
transmitting, by the at least one processor of the third entity, the digital copy and the unique identifier of the digital copy to a computer system of the first entity, said computer system of the first entity comprising the one or more processors.

26. The method of claim 1, wherein the digital copy is protected by a Digital Rights Management (DRM) mechanism.

27. A computer system comprising:
one or more processors, one or more memories coupled to the one or more processors, and one or more computer hardware readable storage devices coupled to the one or more processors, said one or more storage devices containing program code which, upon being executed by the one or more processors via the one or more memories, implement a method for processing a print work, said method comprising:
recording, by the one or more processors in one or more computer readable hardware storage units, a first entity's ownership of a print work that is lawfully owned by the first entity, said print work being a physical copy of an original copyrighted work in a literary work category for which copyright protection is provided to a second entity under United States or foreign copyright law, subject to a limitation that the physical copy is fixed in a physically tangible form that is a non-electronic form and a non-digital form, said print copy being under copyright protection for the second entity that owns a copyright for an original work from which the print work was generated, said first and second entities being different entities;
recording, by the one or more processors in the one or more hardware storage units, a disablement of the print work, said disablement leaving the print work in a reversible state of disablement or in an irreversible state of disablement in which the print work is unusable as a work for which the copyright exists;
after said recording both the ownership and the disablement of the print work and while the state of disablement exists, generating or receiving, by the one or more processors, a digital copy of the original work, said digital copy and the print work being substantially similar copies of the original work aside from the digital copy being in a digital format; and
after initiation of said generating or receiving the digital copy: (i) generating, by the one or more processors, a digital association linking the digital copy with both the recorded ownership and the recorded disablement; and (ii) recording, by the one or more processors, the digital association in the digital copy and/or in the one or more hardware storage units.

28. The computer system of claim 27, wherein said generating or receiving the digital copy comprises receiving the digital copy from a third entity in response to a request for the digital copy made by the first entity to the third entity, and wherein the request includes a unique identification of the print work and verification that both the ownership and the disablement of the print work have been recorded.

* * * * *